(12) United States Patent
Beigel

(10) Patent No.: US 6,933,774 B2
(45) Date of Patent: Aug. 23, 2005

(54) RECTIFYING CHARGE STORAGE ELEMENT WITH TRANSISTOR

(75) Inventor: Michael L. Beigel, Encinitas, CA (US)

(73) Assignee: Precision Dynamics Corporation, San Fernando, CA (US)

(*) Notice: Subject to any disclaimer, the term of this patent is extended or adjusted under 35 U.S.C. 154(b) by 131 days.

(21) Appl. No.: 10/895,428

(22) Filed: Jul. 1, 2003

(65) Prior Publication Data

US 2005/0133847 A1 Jun. 23, 2005

Related U.S. Application Data

(63) Continuation-in-part of application No. 10/155,518, filed on May 24, 2002, now Pat. No. 6,642,782, which is a continuation of application No. 09/723,897, filed on Nov. 28, 2000, now Pat. No. 6,414,543.

(51) Int. Cl.[7] .......................................... H01L 25/00
(52) U.S. Cl. .................................. 327/566; 327/586
(58) Field of Search ............................. 327/564, 565, 327/566, 574, 578, 581, 586

(56) References Cited

U.S. PATENT DOCUMENTS

| | | | |
|---|---|---|---|
| 3,813,927 A | 6/1974 | Furgason | |
| 3,840,800 A | 10/1974 | Laupman | |
| 4,333,072 A | 6/1982 | Beigel | |
| 4,532,467 A * | 7/1985 | Mensink et al. | 323/316 |
| 4,591,738 A * | 5/1986 | Bialas, Jr. et al. | 327/536 |
| 4,707,625 A * | 11/1987 | Yanagisawa | 327/437 |
| 5,731,691 A * | 3/1998 | Noto | 323/220 |
| 5,854,117 A | 12/1998 | Huisman et al. | |
| 5,915,197 A | 6/1999 | Yamanaka et al. | |
| 5,973,598 A | 10/1999 | Beigel | |
| 6,037,718 A | 3/2000 | Nagami | |
| 6,087,196 A | 7/2000 | Sturm et al. | |
| 6,414,543 B1 | 7/2002 | Beigel et al. | |

* cited by examiner

*Primary Examiner*—Jeffrey Zweizig
(74) *Attorney, Agent, or Firm*—Kelly Lowry & Kelley LLP

(57) ABSTRACT

A composite rectifying charge storage device, consisting of a rectifier and a capacitor which share common elements, further includes a transistor.

30 Claims, 2 Drawing Sheets

RECTIFYING CHARGE STORAGE ELEMENT WITH TRANSISTOR

This is a continuation-in-part of U.S. Ser. No. 10/155,518, filed May 24, 2002, now issued as U.S. Pat. No. 6,642,782, and published as Publication No. U.S. 2002/0140500 A1 on Oct. 3, 2002, which in turn is a continuation of U.S. Ser. No. 09/723,897, filed Nov. 28, 2000, and now issued as U.S. Pat. No. 6,414,543 on Jul. 2, 2002.

BACKGROUND OF THE INVENTION

This invention relates generally to improvements in and to a composite rectifying charge storage device of the type having a rectifier and capacitor which share common elements, as described in U.S. Pat. No. 6,414,543 and U.S. Publication U.S. 2002/0140500 A1. More particularly, this invention relates to an improved rectifying charge storage device having a transistor integrated therewith.

U.S. Pat. No. 6,414,543 and U.S. Publication U.S. 2002/0140500 A1, which are incorporated by reference herein, disclose embodiments for a rectifying charge storage element and related electronic circuits suitable for fabrication on various substrates, including flexible substrates, by various means including printing or other deposition techniques using organic conductors, semiconductors and insulators and other electronic materials suitable for deposition and use in electronic circuits. This rectifying charge storage element is disclosed for use as a power supply that extracts DC power (voltage and current) sufficient to power an electronic device from an AC input signal. The AC input signal may be derived from an inductive, capacitive, or L-C resonant circuit coupled to external AC electromagnetic field or electrostatic AC field. The electronic circuit thus powered may comprise a radio frequency identification (RFID) circuit.

In this regard, most electronic circuits require a source of DC voltage with sufficient current output to power the circuit elements. Many of these circuits derive DC power by rectifying and filtering an AC power signal Often, the AC signal is provided to the circuitry by electromagnetic coupling. For example, a passive RFID tag system must be capable of receiving power from an RFID reader to the RFID tag via an inductive (H-field) or electric field (E-field) coupling, and transmitting data from the tag to the reader also via inductive or electric field coupling. The activation field frequency for typical RFID devices may range from less than about 100 kHz up to more than about 30 MHz if inductive or capacitive coupling is utilized, and up to the UHF and microwave region if electric field RF antenna coupling is used. In current industry practice, operating power to a passive RFID tag or other electronic circuit is derived by utilizing a rectifier device and a charge-storage device, typically a rectifier diode or combination of diodes connected to a charge storage capacitor or combination of capacitors. In the past, these elements have been implemented as separate components within a discrete circuit or silicon integrated circuit. See, for example, U.S. Pat. No. 4,333,072.

Recent advancements in circuitry manufacturing processes, applicable to RFID tag and similar electronic circuit systems, have enabled the production of electronic circuits on flexible substrates using thin film materials such as organic and polymer semiconductors and other substances that can be applied by techniques such as ink jet printing. A primary objective is to produce electronic devices that have operating characteristics similar to discrete or integrated silicon circuit technology sufficient to operate certain types of circuits while approaching the economy of printing processes. See, for example, U.S. Pat. Nos. 5,973,598 and 6,087,196.

The rectifying charge storage device disclosed in the above-referenced U.S. Pat. No. 6,414,543 and U.S. Publication U.S. 2002/0140500 A1 incorporates a rectifier component such as a rectifying diode in combination with a charge storage component such as a capacitor, wherein these components share one or more common elements resulting in a composite device that is particularly suited for economical manufacture as by printing processes or the like. In addition, the composite device is especially suited for support on a flexible substrate which may comprise an integral portion of the device. Moreover, the supporting substrate may also comprise an electrically operative portion of the device. However, this rectifying charge storage device has many uses in electronic circuitry other than as a power supply device.

SUMMARY OF THE INVENTION

In accordance with the invention, an improved composite rectifying charge storage device is provided of the type shown and described in U.S. Pat. No. 6,414,543 and U.S. Publication U.S. 2002/0140500 A1, wherein the composite device further incorporates a transistor such as a field effect transistor (FET) integrated therewith. The composite rectifying charge storage device with integrated transistor is suitable for production using thin film materials and flexible substrates, and is useful in a variety of electronic circuit applications.

In one preferred form of the invention, the composite rectifying charge storage device includes a rectifier such as a diode and a capacitor having a common conductor. The capacitor comprises spaced-apart conductive surfaces or areas defined by this common conductor and a second conductor with a dielectric material therebetween. In one form, the common conductor may comprise either the cathode or anode connection to the rectifying diode. In another form, the rectifier comprises a semiconductor material providing the dual functions of rectification and forming the dielectric material between the conductive plates of the capacitor. In either configuration, the device may be formed as by ink jet printing or the like onto a substrate which may comprise a flexible substrate. The substrate may be provided as a separate component having the rectifying charge storage device formed or mounted thereon. Alternately, the substrate can be formed integrally with the rectifying and charge storage device, for example, by integrating the substrate with the dielectric material.

In one preferred form, the common conductor shared by the diode and capacitor components of the composite rectifying charge storage device is additionally coupled to and forms one junction such as the gate conductor of the integrated transistor component. In this configuration, the second conductor of the composite device is also shared by the transistor component, forming a conductive path between the source and drain conductors of the transistor component. All of these components of the composite device may be mounted on, applied to or carried by the dielectric material formed between the common and second conductors defining the capacitor component, wherein this dielectric material may also incorporate or define a suitable substrate which may be flexible.

In one alternative preferred form, the common conductor is additionally coupled to and forms the drain conductor of the integrated transistor component. In this configuration, the source conductor of the transistor component may be coupled to the drain conductor via a suitable semiconductor which acts as a channel region for transfer of electrons between the common conductor/drain conductor and the source conductor of the transistor component. These drain and source conductors, and the associated semiconductor channel region may be mounted on, applied to or carried by the dielectric material of the capacitor component, with a gate conductor in opposition thereto at an opposite side of the dielectric material.

Other features and advantage of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
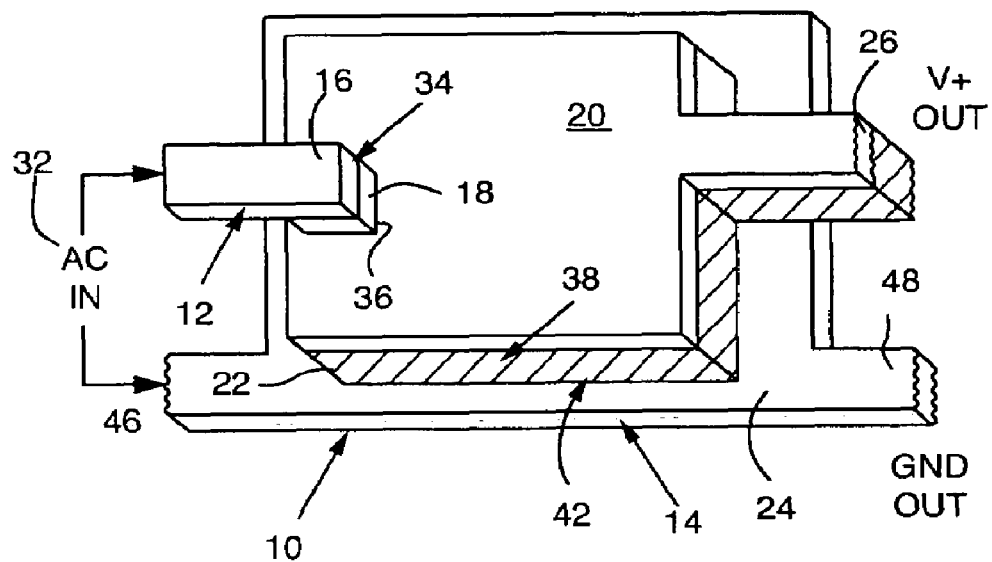
FIG. 1 shows a somewhat schematic perspective view illustrating a composite rectifying charge storage device for use in the invention.

As shown in the exemplary drawings, an improved composite rectifying charge storage device referred to generally by the reference numeral 10 incorporates an integrated transistor 50 (FIGS. 4–7) such as an insulated-gate field effect transistor (FET) or the like. The composite rectifying charge storage device with integrated transistor is suitable for production using thin film materials and flexible substrates, providing a reduced or more compact circuit footprint area, and is useful in a variety of electronic circuit applications.

The improved rectifying charge storage device 10 corresponds generally with the device shown and described in parent U.S. Pat. No. 6,414,543 and in copending U.S. Publication U.S. 2002/0140500 A1, both of which are incorporated by reference herein. In this regard, as viewed in FIG. 1 with respect one preferred form for use in a power supply application, the illustrative rectifying charge storage device 10 generally includes a diode rectifier 12 and a capacitor 14 which share common elements. The diode 12 includes a conductor 16 and a semiconductor 18. A common conductor 20 between the diode 12 and capacitor 14 is superimposed on a dielectric component 22 of the capacitor 14 which, in turn, is mounted on a second or ground conductor 24.

The conductor 16 is electrically connected to one terminal 30 of a suitable AC source 32, and is electrically connected to one surface of the semiconductor 18 at a surface interface 34. The opposite surface of the semiconductor 18 is electrically connected to the common conductor 20 at a surface interface 36. The common conductor 20 is connected to the dielectric component 22 at a surface interface 38, and the conductor 24 is connected to the dielectric component 22 at a surface interface 42. The conductor 24 is connected to a second terminal 46 of the AC source 32 and also serves as the ground output terminal 48.

Rectification takes place between the conductor 16, the semiconductor 18, and the common conductor 20 through the interfaces 34 and 36. Charge storage takes place across the capacitor 14, between the capacitor plates defined by the common conductor 20 and the second conductor 24 with the dielectric component 22 disposed therebetween. The surface area of the rectifying component and 16, 34, 18, 36, and 20 interfaces may be minimized to reduce internal parasitic capacitor characteristics inherent in rectification. The surface area of the capacitive component interface provided by the common conductor 20 may be maximized to increase DC charge storage capacity. In this illustrative power supply application, the common conductor 20 provides the DC power output at a junction 26.

The diode component may be fabricated from various materials, including inorganic semiconductor nanocrystals such as CdSe, InP, and others. Furthermore, conjugated polymers may be used, such as poly(phenylene-vinylene) (PPV), its derivatives and co-polymers (such as MEH-PPV (poly(2-methoxy, 5-(2'-ethyl-hexoxy)-ρ-phenylene vinylene))); polyfluorene (PF), its derivatives and co-polymers; polyparaphenylene (PPP), its derivatives and co-polymers; polythiophene (PT), its derivatives and co-polymers; and others.

The rectifying function of the diode 12 is implemented through the conductor 16 which serves as the anode and the common conductor 20 which serves as the cathode. The rectifying character of an organic or a polymeric diode usually requires different conductors with different work functions for the anode and for the cathode. Organic and polymeric semiconductors are usually regarded as semiconductors with low doping concentration (usually in the range of $\sim 10^{13}$ cm$^{-3}$), hence the theory of p-n junction commonly used inorganic semiconductor diodes is not applicable here.

For inorganic diodes, metal electrodes for the anode and cathode can be the same material with ohmic contacts to the p-type and n-type semiconductor, respectively. The rectifying behavior is from the p-n junction.

For organic semiconductors, the relative position of the work functions (or the energy level) of the metal electrodes to the energy levels of the conduction band and valence band of the organic semiconductor determines the rectifying behavior. The choice of anode hence is preferentially to be high work function metals such as gold, nickel, and their alloys. Alternatively, some metal oxides, including but not limited to indium tin-oxide, indium oxide, are also candidates for the anode material. For the cathode, the choice is preferentially low work function metals, including but not limited to calcium, lithium, magnesium, and others. Recently, the metal alloys consisting of a small amount of low work function metals, such as aluminum:lithium 3% alloy and 97% Al:LiF bilayer electrode, have become alternatives for the choice of cathode material.

Figure 2:
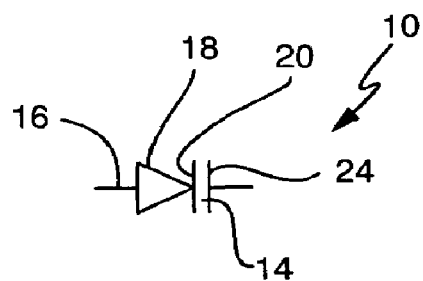
FIG. 2 is a circuit diagram illustrating the composite device of FIG. 1 in one form.
Figure 3:
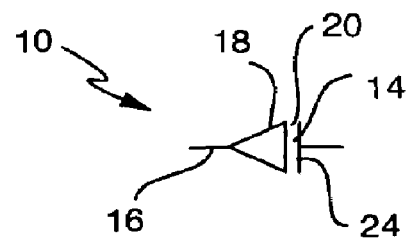
FIG. 3 is a circuit diagram illustrating the composite device of FIG. 1 in an alternative form.

In the case where the conductor 16 is formed from a relatively high work function metal such as a thin layer of aluminum or gold, a layer of low work function material is used for the common conductor 20. In this configuration, the conductor 16 comprises the anode connection to the semiconductor or diode component 18, with the common conductor 20 comprising the cathode connection to yield a composite device 10 having an electrical schematic as viewed in FIG. 2. Conversely, when the conductor 16 is formed from a low work function material, the common conductor 20 should be formed from a comparatively high work function metal such as aluminum or gold. In this latter configuration, the common conductor 20 comprises the anode connection for the semiconductor 18, and conductor 16 comprises the cathode connection, resulting in a composite device having an electrical schematic as viewed in FIG. 3.

Alternative organic semiconductors, referred to as high performance organic semiconductor devices, are shown and described in copending U.S. Ser. No. 10/218,141, filed Aug. 12, 2002, and incorporated by reference herein.

The materials for the capacitor dielectric 22 should be insulating materials, preferentially with a high dielectric constant to enhance its capacity. The structure of the capacitor 14 should provide a larger area compared to the diode. The dielectric 22 may be an organic or polymeric or inorganic insulator with reasonable dielectric constant. It should be large enough to hold enough charge, and it should also be small enough such that the device 10 has a fast response time. Currently, polymer materials such as polystyrene, polyethylene, and polycarbonate are ideal candidates. The dielectric 22 should be flexible where the other components of the device 10 are flexible.

In alternative configurations as shown and described in more detail in parent U.S. Pat. No. 6,414,543 and in copending U.S. Publication U.S. 2002/0140500 A1, the composite device 10 may be mounted onto a suitable substrate (not shown in FIG. 1) which may comprise a flexible substrate. Or, if desired, the substrate which may be flexible can be formed by a portion of the composite device 10, such as by incorporating the substrate directly into the dielectric component 22. Alternatively, or additionally, the dielectric component 22 may be defined by a combination semiconductor and dielectric layer for performing the dual functions of rectification and insulation between the capacitor plates. Any or all of these features may be incorporated into a planar array, and may further include capacitor plates having an interdigitated configuration.

Figure 4:
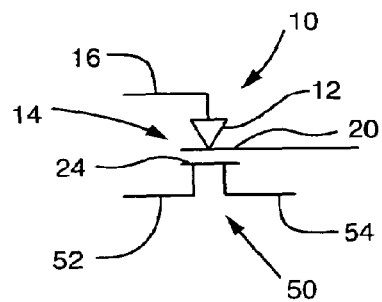
FIG. 4 is a circuit diagram depicting the composite device of FIG. 1 having a transistor integrated therewith, in accordance with one preferred form of the invention.
Figure 5:
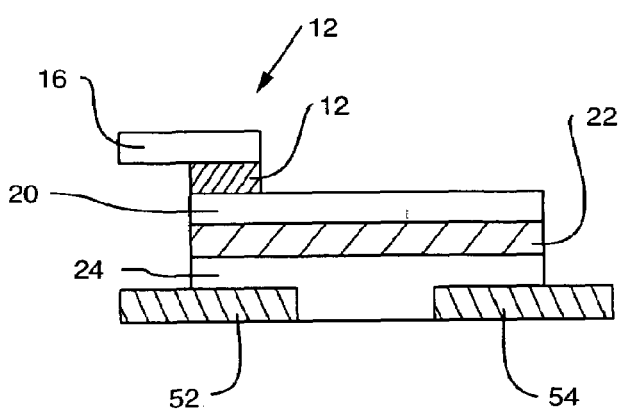
FIG. 5 is a schematic sectional view of the composite device with integrated transistor depicted in FIG. 4.

In accordance with the present invention, as viewed schematically in FIG. 4, the composite device 10 further incorporates the integrated transistor 50 such as a field effect transistor (FET) which shares common elements with the composite device, and thereby provides an electronic circuit element having an extremely small footprint area. This combined circuit element, including the composite rectifying charge storage device 10 with the integrated transistor 50 is particularly suitable for production using thin film materials and flexible substrates. FIG. 5 is a schematic sectional view illustrating this combined circuit element of FIG. 4 in one preferred form.

As shown, the composite device 10 includes a diode component 12 such as a semiconductor 18 (FIG. 5) coupled to an input or anode conductor 16. The diode component 12 has its cathode junction coupled to the common conductor 20 which is shared with a capacitor component 14 defined by the common conductor 20 spaced from a second conductor 24 by means of the intervening dielectric material 22. In accordance with the invention, this second conductor 24 comprises an organic semiconductor, and carries a source component 52 and a drain component 54 of the transistor 50, in spaced apart relation. Accordingly, in this configuration, the common conductor 20 is also shared by the transistor 50, and forms the gate component or gate junction thereof, whereas the second conductor 24 additionally functions as a channel region for transfer of electrons between the source and drain junctions 52, 54. In a preferred arrangement, the work function of the input conductor 16 of the diode component 12 differs from the work function of the common conductor 20 and the source and drain components 52, 54.

Figure 6:
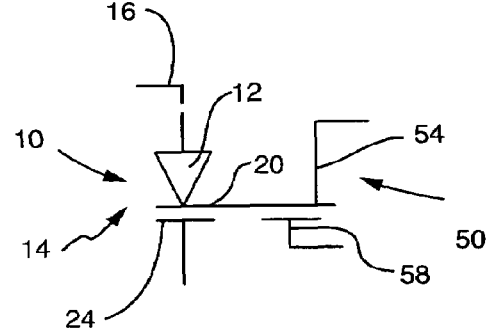
FIG. 6 is a circuit diagram showing the composite device of FIG. 1 having a transistor integrated therewith, in accordance with one alternative preferred form of the invention.
Figure 7:
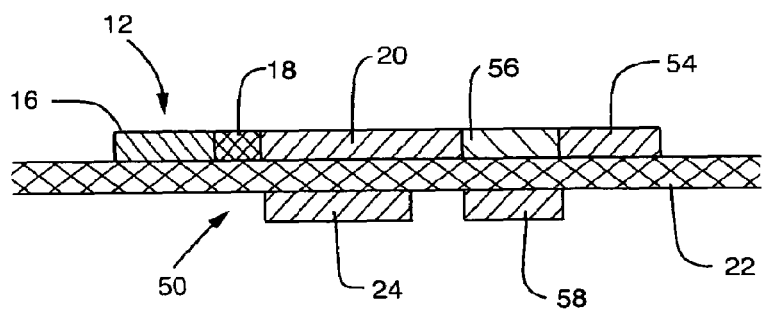
FIG. 7 is a schematic sectional view of the composite device with integrated transistor depicted in FIG. 6.

FIGS. 6 and 7 depict an alternative preferred embodiment of the invention, wherein the common conductor 20 of the composite rectifying charge storage device 10 is shared with a different terminal or junction of the transistor 50, such as the drain junction. In this configuration, the composite device 10 again comprises a diode component 12 such as a diode semiconductor 18 connected to a suitable input or anode conductor 16. The diode component 12 has its cathode junction coupled to the common conductor 20 which is shared with a capacitor component 14 defined by the common conductor 20 spaced from a second conductor 24 by means of the intervening dielectric material 22. The materials used to form the input conductor 16 and the common conductor 20 will normally exhibit different work functions.

The transistor 50 shown in the FIGS. 6–7 is also carried by the dielectric 22, to include a composite drain terminal or junction integrated with the common conductor 20. An organic semiconductor 56 is associated with the common conductor 20 and acts as a channel region for the transistor for transfer of electrons between the drain terminal/common conductor 20 and a source terminal 54 of the same work function material. A gate terminal 58 for the transistor 50 is carried by the dielectric 22 in opposition to the transistor semiconductor 56. In this arrangement as viewed in FIG. 5, the source terminal 54, the gate terminal 58, the capacitor electrode 24, and the common electrode 20 may be connected to external devices. The transistor structure corresponds to that shown and described in U.S. Pat. No. 6,278,127, which is incorporated by reference herein.

Other features and advantage of the present invention will become more apparent from the following detailed description, taken in conjunction with the accompanying drawings which illustrate, by way of example, the principles of the invention.

What is claimed is:

1. A rectifying charge storage element, comprising:
a rectifier structure fabricated with a common conductor forming a side of the rectifier structure;
a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor; and
a transistor incorporating the common conductor as one junction thereof;
wherein said transistor incorporates the common conductor as a gate conductor thereof, said capacitor structure comprises said common conductor, a second conductor, and a dielectric material therebetween, and wherein said second conductor comprises an organic semiconductor device, said transistor further incorporating said second conductor as source and drain conductors thereof, said second conductor forming a channel region for electron transfer between said source and drain conductors.

2. The rectifying charge storage element of claim 1, wherein said rectifier and capacitor structures and said transistor are carried on a common substrate.

3. The rectifying charge storage element of claim 2, wherein said common substrate is a flexible substrate.

4. The rectifying charge storage element of claim 2, wherein said capacitor structure incorporates said common substrate.

5. A rectifying charge storage element, comprising:
a rectifier structure fabricated with a common conductor forming a side of the rectifier structure;
a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor; and
a transistor incorporating the common conductor as one junction thereof;
wherein said transistor incorporates the common conductor as a drain conductor thereof, wherein said capacitor structure comprises said common conductor, a second conductor, and a dielectric material therebetween, and wherein said transistor further includes gate and source conductors carried by said dielectric material, and further including an organic semiconductor carried by said dielectric material and forming a channel region for electron transfer between said source and drain conductors.

6. A rectifying charge storage element, comprising:
a rectifier structure fabricated with a common conductor forming a side of the rectifier structure;
a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor, said capacitor structure comprising said common conductor, a second conductor, and a dielectric material therebetween; and
a transistor incorporating the common conductor as one junction thereof;
said transistor incorporating the common conductor as a drain conductor thereof;
wherein said rectifier and capacitor structures and said transistor are carried on a common flexible substrate.

7. The rectifying charge storage element of claim 6, wherein said capacitor structure incorporates said common substrate.

8. A rectifying charge storage element, comprising:
a rectifier structure fabricated with a common conductor forming a side of the rectifier structure;
a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor; and
a transistor incorporating the common conductor as one junction thereof;
wherein said rectifier structure includes a diode having an anode conductor and a cathode junction incorporating said common conductor, and further wherein said capacitor structure comprises said common conductor, a second conductor, and a dielectric material therebetween, said anode conductor and said common conductor being formed from materials having different work functions; and
wherein said second conductor comprises an organic semiconductor device, said transistor incorporates said common conductor as a gate conductor thereof and further incorporates said second conductor as source and drain conductors thereof, said second conductor forms a channel region for electron transfer between said source and drain conductors, and wherein said source and drain conductors are each formed from a material having a work function different from the work function of the material forming said anode conductor.

9. The rectifying charge storage element of claim 8, wherein said rectifier and capacitor structures and said transistor are carried on a common substrate.

10. A rectifying charge storage element, comprising:
a rectifier structure fabricated with a common conductor forming a side of the rectifier structure;
a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor; and
a transistor incorporating the common conductor as one junction thereof;
wherein said rectifier structure includes a diode having an anode conductor and a cathode junction incorporating said common conductor, and further wherein said capacitor structure comprises said common conductor, a second conductor, and a dielectric material therebetween, said anode conductor and said common conductor being formed from materials having different work functions; and
wherein said transistor incorporates the common conductor as a drain conductor thereof, said transistor further including gate and source conductors carried by said dielectric material, and further including an organic semiconductor carried by said dielectric material and forming a channel region for electron transfer between said source and drain conductors.

11. The rectifying charge storage element of claim 10, wherein said rectifier and capacitor structures and said transistor are carried on a common substrate.

12. The rectifying charge storage element of claim 10, wherein said transistor comprises an FET transistor.

13. A rectifying charge storage element, comprising:
a rectifier;
a common conductor connected to one side of said rectifier;
a capacitor incorporating said common conductor;
said rectifier, common conductor and capacitor comprising a unitary element; and
a transistor incorporating said common conductor as one junction thereof;
wherein said rectifier and capacitor and transistor are carried on a common flexible substrate.

14. The rectifying charge storage element of claim 13, wherein said transistor comprises an FET transistor.

15. The rectifying charge storage element of claim 13, wherein said transistor incorporates the common conductor as a gate conductor thereof.

16. The rectifying charge storage element of claim 13, wherein said transistor incorporates the common conductor as a drain conductor thereof.

17. A rectifying charge storage element, comprising:
a rectifier;
a common conductor connected to one side of said rectifier;
a capacitor incorporating said common conductor;
said rectifier, common conductor and capacitor comprising a unitary element; and
a transistor incorporating said common conductor as one junction thereof,
wherein said transistor incorporates the common conductor as a gate conductor thereof, and said capacitor comprises said common conductor, a second conductor comprising an organic semiconductor, and a dielectric material therebetween, said transistor further incorporating said second conductor as source and drain conductors thereof, said second conductor forming a channel region for electron transfer between said source and drain conductors.

18. The rectifying charge storage element of claim 17, wherein said capacitor incorporates a common substrate carrying said rectifier, capacitor and transistor.

19. A rectifying charge storage element, comprising:
a rectifier;
a common conductor connected to one side of said rectifier;
a capacitor incorporating said common conductor;
said rectifier, common conductor and capacitor comprising a unitary element; and
a transistor incorporating said common conductor as one junction thereof;
wherein said capacitor comprises said common conductor, a second conductor, and a dielectric material therebetween, said transistor further including gate and source conductors carried by said dielectric material, and further including an organic semiconductor carried by said dielectric material and forming a channel region for electron transfer between said source and drain conductors.

20. The rectifying charge storage element of claim 19, wherein said capacitor incorporates a common substrate carrying said rectifier, capacitor and transistor.

21. A rectifying charge storage element, comprising:
a rectifier;
a common conductor connected to one side of said rectifier;
a capacitor incorporating said common conductor;
said rectifier, common conductor and capacitor comprising a unitary element; and
a transistor incorporating said common conductor as one junction thereof;
wherein said rectifier includes a diode having an anode conductor and a cathode junction incorporating said common conductor, and further wherein said capacitor comprises said common conductor, a second conductor, and a dielectric material therebetween, said anode conductor and said common conductor being formed from materials having different work functions.

22. The rectifying charge storage element of claim 21, wherein said second conductor comprises an organic semiconductor device, said transistor incorporates said common conductor as a gate conductor thereof and further incorporates said second conductor as source and drain conductors thereof, said second conductor forms a channel region for electron transfer between said source and drain conductors, and wherein said source and drain conductors are each formed from a material having a work function different from the work function of the material forming said anode conductor.

23. The rectifying charge storage element of claim 22, wherein said capacitor incorporates a common substrate carrying said rectifier, capacitor and transistor.

24. A rectifying charge storage element, comprising:
a rectifier;
a common conductor connected to one side of said rectifier;
a capacitor incorporating said common conductor;
said rectifier, common conductor and capacitor comprising a unitary element; and
a transistor incorporating said common conductor as one junction thereof;
wherein said transistor incorporates the common conductor as a drain conductor thereof, said transistor further including gate and source conductors carried by said dielectric material, and further including an organic semiconductor carried by said dielectric material and forming a channel region for electron transfer between said source and drain conductors.

25. The rectifying charge storage element of claim 24, wherein said capacitor incorporates a common substrate carrying said rectifier, capacitor and transistor.

26. A rectifying charge storage element, comprising:
a rectifier structure fabricated with a common conductor forming a side of the rectifier structure;
a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor; and
a transistor incorporating the common conductor as one junction thereof;
wherein said rectifier and capacitor structures and said transistor are carried on a common flexible substrate.

27. The rectifying charge storage element of claim 26, wherein said capacitor structure incorporates said common substrate.

28. The rectifying charge storage element of claim 26, wherein said transistor incorporates the common conductor as a drain conductor thereof.

29. The rectifying charge storage element of claim 28, wherein said capacitor structure comprises said common conductor, a second conductor, and a dielectric material therebetween.

30. The rectifying charge storage element of claim 29, wherein said transistor further includes gate and source conductors carried by said dielectric material, and further including an organic semiconductor carried by said dielectric material and forming a channel region for electron transfer between said source and drain conductors.

* * * * *